United States Patent [19]

Bell et al.

[11] Patent Number: 5,155,521

[45] Date of Patent: Oct. 13, 1992

[54] COUNTER-DRIVEN SHUTTER ACTUATOR CONTROL CIRCUIT

[75] Inventors: Cynthia S. Bell, Webster; Goodwin Ting; John D. Meierdiercks, both of Rochester, all of N.Y.

[73] Assignee: Eastman Kodak Company, Rochester, N.Y.

[21] Appl. No.: 636,334

[22] Filed: Dec. 31, 1990

[51] Int. Cl.⁵ ............................................... G03B 7/08
[52] U.S. Cl. ................................. 354/439; 354/437; 354/452
[58] Field of Search .............. 354/437, 439, 452, 458

[56] References Cited

U.S. PATENT DOCUMENTS

| | | | |
|---|---|---|---|
| 3,903,528 | 9/1975 | Kee | 354/437 |
| 4,037,233 | 7/1977 | Shinoda et al. | |
| 4,213,688 | 7/1980 | Mikajiri | |
| 4,297,012 | 10/1981 | Nakai | |
| 4,325,614 | 4/1982 | Grimes | 354/437 |
| 4,333,722 | 6/1982 | Lee | |
| 4,542,970 | 9/1985 | Suzuki et al. | |
| 4,720,726 | 1/1988 | Sato et al. | 354/439 |
| 4,743,935 | 5/1988 | Takemae | |
| 4,751,543 | 6/1988 | Kodaira et al. | 354/437 |
| 4,835,564 | 5/1989 | Nakagawa | |

FOREIGN PATENT DOCUMENTS 2206699 1/1989 United Kingdom.

*Primary Examiner*—Russell E. Adams
*Attorney, Agent, or Firm*—Edward Dugas

[57] ABSTRACT

A multipurpose interface circuit through which the control current for operating an electromagnetically driven shutter actuator for applications such as a still camera may be precisely defined throughout a shutter actuation sequence (open, hold and close) has a clock signal counter unit, which contains a set of counter circuits associated with respective components of the shutter actuator drive current waveform. The counter circuits are sequentially enabled to count clock signals generated by a clock signal generator. The counter circuits produce output signals in accordance with a set of relationships among the numbers of clock signals counted and a set of shutter control codes representative of desired shutter aperture size and shutter speed. A control circuit is coupled to the clock signal counter unit for controlling the generation of the respective components of the actuator drive current in accordance with output signals produced by the clock signal counter circuit.

34 Claims, 7 Drawing Sheets

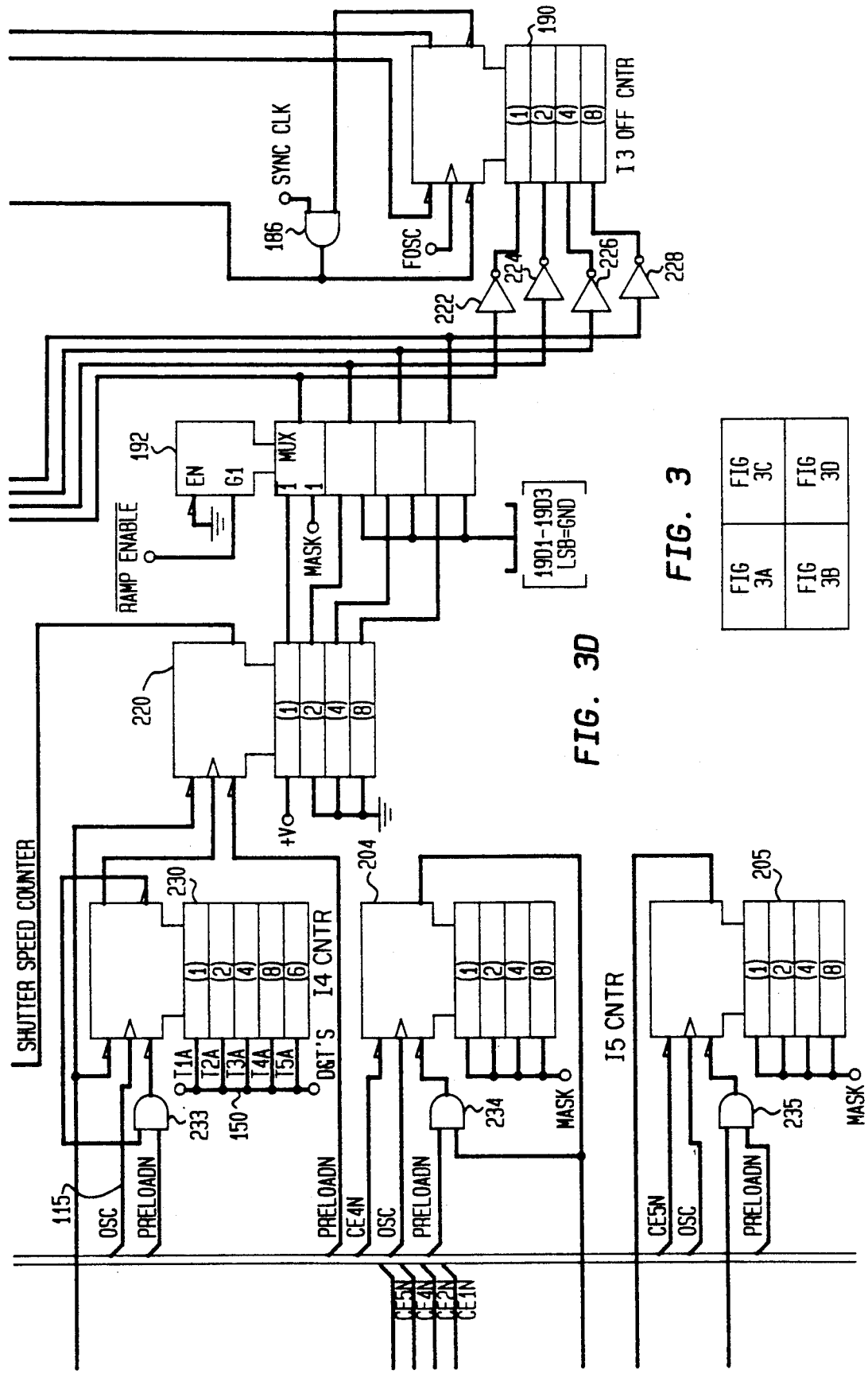

| D3 | D2 | D1 | APERTURE | | T3 | T2 | T1 | SHUTTER SPEED |
|---|---|---|---|---|---|---|---|---|
| 1 | 1 | 1 | f/2.0 | | 1 | 1 | 1 | 1/60 |
| 1 | 1 | 0 | f/2.8 | | 1 | 1 | 0 | 1/60 |
| 1 | 0 | 1 | f/4.0 | | 1 | 0 | 1 | 1/60 |
| 1 | 0 | 0 | f/5.6 | | 1 | 0 | 0 | 1/125 |
| 0 | 1 | 1 | f/8 | | 0 | 1 | 1 | 1/250 |
| 0 | 1 | 0 | f/11 | | 0 | 1 | 0 | 1/500 |
| 0 | 0 | 1 | f/16 | | 0 | 0 | 1 | 1/1000 |
| 0 | 0 | 0 | USE SHUTTER (+), (−) INPUTS | | 0 | 0 | 0 | USE BOTH EDGES OF SHUTTER (+) |

COUNTER-DRIVEN SHUTTER ACTUATOR CONTROL CIRCUIT

FIELD OF THE INVENTION

The present invention relates in general to optical shutter control mechanisms and is particularly directed to a clock-driven programmable sequencer, which controls the generation of actuator drive current for opening, open-retention and closing a shutter.

BACKGROUND OF THE INVENTION

The microminiaturization of a wide variety of electronic circuits and electromagnetic devices has made it possible not only to reduce the size and cost of signal processing hardware components, but also to add functionality and increase the performance of many types of industrial equipment and consumer products. As an example, many optical systems and devices, such as photographic still cameras, currently employ a microprocessor to supervise a plurality of functions. In the environment of a still camera, these operations include, for example, film advance, automatic focus, shutter actuation, and auxiliary functions, such as flash control. Now, although the microprocessor typically furnishes the supervisory intelligence for system operation, it is still necessary to provide the necessary interfacing of the microcontroller's outputs to the system hardware. Since it is often the case that the operated component has physical mass and therefore inertia when displaced (such as the opening and closing of shutter blades), the interface often requires specific signal shaping circuitry to achieve the precision displacement necessary for successful (shutter) operation. Moreover, in many applications, the desired functionality may not mandate use of all of the sophisticatior that the microcontroller can provide. A simple circuit may do the job.

SUMMARY OF THE INVENTION

In accordance with the present invention, the above-discussed attributes of both computer-driven and custom circuit approaches to control the opening and closing of a shutter mechanism are incorporated in a multi-purpose interface circuit through which the control current for driving an electromagnetically driven shutter actuator may be precisely defined throughout the shutter actuation sequence (open, hold and close). In particular, the present invention is directed to a shutter control mechanism, such as may be incorporated in a still camera, having a shutter actuator control circuit for supplying actuator drive current to a shutter actuator for controlling the opening and closing of the shutter. The actuator drive current is comprised of a sequence of pulsed current components which cause the shutter actuator to open the shutter to a specified aperture size, hold the shutter open at that target aperture for a duration based upon desired shutter speed, and then return the shutter to its closed position.

In order to generate this sequence of pulse current components, the control circuit of the present invention contains a clock signal counter unit, which contains a set of counter circuits associated with the components of the actuator drive current. The counter circuits are sequentially enabled to count clock signals generated by a clock signal generator. The counter circuits produce output signals in accordance with a set of relationships among the numbers of clock signals counted and shutter control codes representative of desired shutter aperture size and shutter speed. A control circuit is coupled to the clock signal counter unit for controlling the generation of the respective components of the actuator drive current in accordance with output signals produced by the clock signal counter circuit. A master counter sequences through successive time intervals associated with the successive components of the drive current and controls the counting of clock signals by the clock signal counter unit.

The respective components of the drive current include a shutter opening component defined by a first current pulse, of a first polarity and a first duration, which drives the shutter actuator for causing the shutter to be accelerated from its closed position toward a specified open position. This first current pulse is followed by an immediately succeeding, second current pulse, of a second polarity and a second duration, which functions to brake the opening of the shutter, whereby the shutter is brought to an open position.

To define the duration of the shutter opening component of the actuator drive current, the clock signal counter unit contains first and second counter circuits respectively associated with the first and second successive current pulses, the first counter circuit counting clock signals and generating an output signal representative of the duration of the first current pulse upon reaching a prescribed count associated with the aperture size of the shutter opening. The second counter circuit begins counting clock signals in response to the output signal generated by the first counter circuit and, upon reaching a prescribed count, produces an output signal representative of the duration of the second current pulse, the total duration of the first and second current pulses corresponding to the aperture size to which the shutter is opened in accordance with the shutter aperture size-representative code.

The drive current further includes an open shutter-holding component formed of a sequence of third current pulses of the first polarity and a duty cycle that is sufficient to counter-balance the normal 'closing' bias of a shutter closure spring, so that the shutter is held in its open position for a duration defined in accordance with the shutter speed code.

For defining the duty cycle of the shutter-holding component, the clock signal counter unit comprises third and fourth counter circuits. The third counter circuit begins counting clock signals in response to the output signal produced by the second counter circuit and generates an output signal representative of the on-time of the third current pulse. The fourth counter circuit begins counting clock signals in response to the output signal produced by the third counter circuit and generates an output signal representative of the off-time of the third current pulse. The third and fourth counter circuits are alternately restarted, so that they produce the sequence of third current pulses. The total of the on-times and off-times of the sequence of third current pulses corresponds to the length of time that the shutter is held at its predetermined open position in accordance with the shutter speed representative code.

This shutter speed-representative code is applied to a shutter speed counter, which begins counting clock signals in response to the termination of the output signal produced by the second counter and controls the length of time that the sequence of third current pulses is generated, thereby controlling the length of time that the shutter is held in its open position.

The closing component of the drive current is formed of a fourth current pulse of the second polarity and a fourth duration, which immediately succeeds the completed duration of the last third current pulse of the open shutter-holding sequence. This fourth current pulse causes the shutter actuator to accelerate the shutter from its open position toward its closed position. It is immediately succeeded by a fifth current pulse of the first polarity and a fifth duration, which brakes the closing of the shutter, whereby the shutter is returned to its original closed position. To define the durations of the fourth and fifth current pulses, the clock signal counter unit comprises respective fifth and sixth counter circuits. The fifth counter circuit begins counting clock signals in response to the completion of the sequence of third current pulses and produces an output signal representative of the duration of the fourth current pulse. The sixth counter circuit begins counting clock signals upon the completion of the counting operation of the fifth counter circuit and produces an output signal representative of the duration of the fifth current pulse, the combination of said fourth and fifth current pulses corresponding to the actuator drive current necessary to return said shutter to its closed position.

The shutter actuator control circuit of the present invention is also selectively operable to successively displace the shutter from its closed position to a preliminary open position and then gradually further open the shutter to a target aperture. Upon reaching the target aperture, the shutter is driven to its closed position. For this purpose, the parameters of the first and second current pulses are set so that the shutter is opened to a preliminary position. From this preliminary open position, the shutter is then gradually opened to its target aperture by successively changing the on and off times of the third current pulses. Specifically, the count values for the third and fourth counters are complementarily ramped, which effectively increases the duty cycle of the third current pulses and thereby increases the opening of the shutter.

The multipurpose interface circuit in accordance with the present invention is also coupled to generate an external control signal, such as a flash control signal for causing a flash control mechanism to operate a flash device, in synchronism with one of the current pulses, e.g. in substantial coincidence with the start of the fourth current pulse which initiates the closing of the shutter.

In addition, rather than establish the durations of the respective components of the current drive current in accordance with the pulse duration defining actions of the clock signal counter unit, counters may be controllably by-passed and actuator drive current specified in accordance with an external (intelligent) source.

BRIEF DESCRIPTION OF THE DRAWINGS

FIGS. 3A, 3B, 3C and 3D together as shown in FIG. 3 show a logic diagram of the shutter actuator control circuit of FIG. 1;

DETAILED DESCRIPTION

Figure 1:
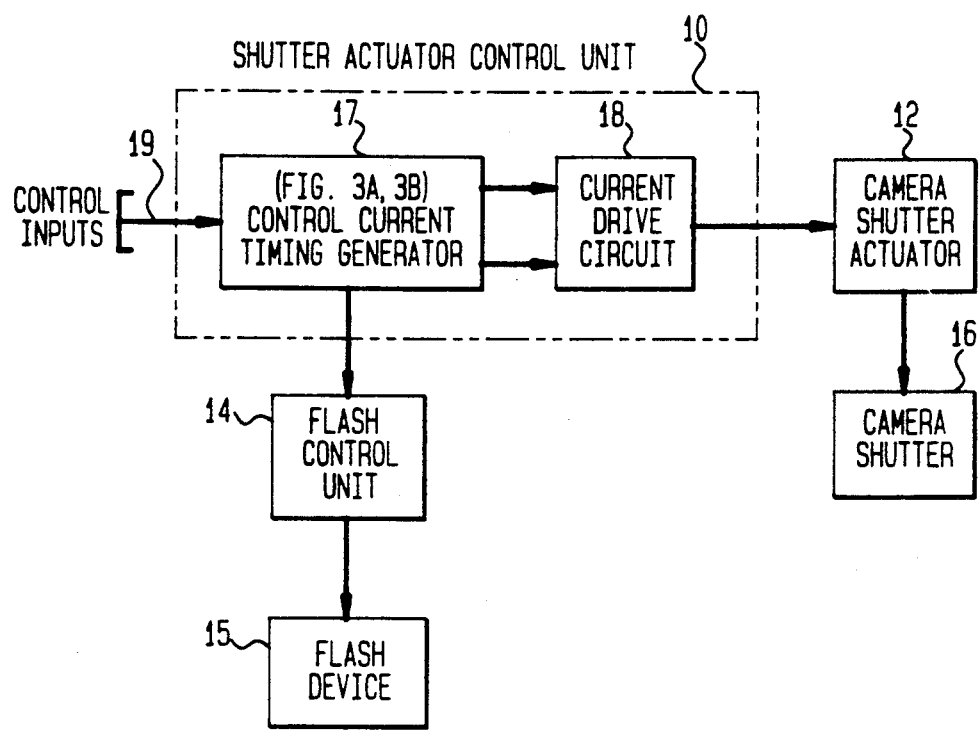
FIG. 1 diagrammatically illustrates the environment of a still camera which incorporates a shutter control circuit according to the present invention, for controlling both the supply of actuator drive current to a shutter actuator and the operation of an external unit (e.g. flash)

FIG. 1 diagrammatically illustrates a shutter control apparatus in accordance with the present invention, as applied to the environment of a still camera. It should be observed, however, that the invention is not limited to use with only a still camera, but may be employed in a variety of applications where control of an optical exposure transmission path is required. The environment of a still camera has been chosen merely for purposes of setting forth an illustrative embodiment of the invention's use.

In the environment of still camera diagrammatically illustrated in FIG. 1, a shutter actuator control circuit 10 is provided for controlling both the supply of actuator drive current to a shutter actuator 12 and the operation of an auxiliary device, such as a flash control unit 14. For effecting physical displacement (opening and closing) of the blades of shutter 16, actuator 12 contains an (electromagnetically driven) shutter mechanism, the drive current for which is supplied by a current drive circuit 18 within shutter actuator control circuit 10. The waveform of this drive current is generally of the form shown in FIG. 2 and is established by a control current timing generator 17, control inputs to which, including control codes representative of target aperture size and shutter speed, are supplied via an input link 19.

As will be described in detail below with reference to FIGS. 3A and 3B, control current timing generator 17 within shutter actuator control circuit 10 contains a plurality of time interval-defining down counter circuits. Under the control of a successively incremented master counter circuit, these time interval-defining down counter circuits are sequentially enabled to count clock signals and produce respective output signals that delineate successive components of the drive current waveform, such as that shown in FIG. 2. The count totals at which the respective down counter circuits produce output signals are determined by the aperture size and shutter speed control codes supplied via link 19.

Figure 2:
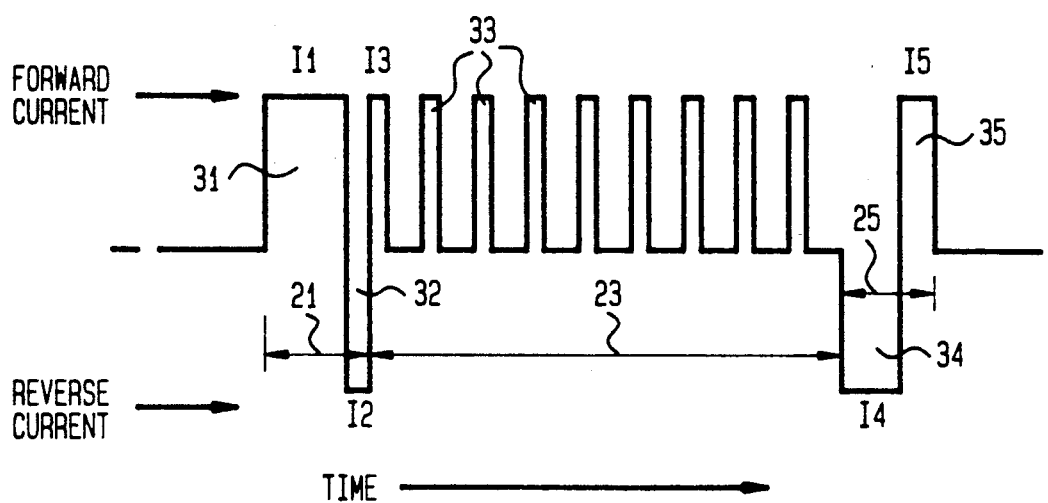
FIG. 2 shows the waveform of a pulsed drive current capable of being produced by the shutter control circuit of the present invention for controlling an electromagnetically driven shutter mechanism.

Referring again to FIG. 2, the waveform of the shutter actuator drive current is shown as being comprised of a sequence of pulsed current components, which cause the shutter actuator to open the shutter to a specified or target aperture size, hold the shutter open at that target aperture for a prescribed period of time associated with the desired shutter speed, and then return the shutter to its closed position. As shown in FIG. 2, the drive current waveform includes a shutter opening component 21, defined by a first forward current pulse 31 of a first polarity (e.g. positive, as shown) and a first pulse width or time interval I1. Current pulse 31 is applied to a shutter actuator, so that a motive force is imparted to the shutter sufficient to overcome the initial friction between closed, overlapping shutter blades (commonly termed 'stiction'), whereby the shutter is accelerated from its closed position toward a specified aperture size or 'open position'.

Immediately following pulse 31 is a second constant current pulse 32, of a second polarity (e.g. negative, as illustrated) and a second pulse width I2, which functions to brake the opening of the shutter blades that was caused by pulse 31, so that the opening movement of the shutter blades is decelerated and brings the shutter blades to a target aperture size at the end of time interval I2.

Once the shutter has been opened to its target aperture, the length of time 23 that the shutter is held in this open position is defined by a sequence of third current pulses 33 of the first polarity. The number of third current pulses in the waveform of FIG. 2 is defined in accordance with shutter speed (exposure time interval 23). These third pulses have a duration or width that is sufficient to hold the shutter open at the target aperture against a normal(spring-) biasing of the blades toward their closed position. The duty cycle or percentage of time, within a pulse repetition interval of a current pulse 33, that forward current flows corresponds to interval I3 and depends upon aperture size. During the complementary (or off) period of the pulse interval no current flows. The pulse repetition frequency is well above the natural frequencies of the shutter, so as to be effectively integrated to a pseudo-continuous holding level.

When the exposure period is completed at the end of interval 23, the shutter is closed by reversing the flow of shutter actuator drive current. Specifically, upon completion of the off-time for the last current pulse 33 at the end of shutter holding-open interval 23, the drive current waveform is pulsed, at 34, in a negative or reverse current polarity direction for a fourth duration I4, which causes the shutter actuator to accelerate the shutter from its open position toward its closed position. The duration I4 of reverse current pulse 34 is shorter than the first interval I1 due to the fact that the shutter is normally (spring) biased closed, so that less energy is required to return the shutter to its initially closed position. At the end of closure acceleration interval I4, a forward, braking current pulse 35 is applied for a closure-braking interval I5, which causes the actuator to brake or decelerate the closing of the shutter, whereby the shutter blades are returned to their original closed position without bounce or overshoot.

Figure 3A:
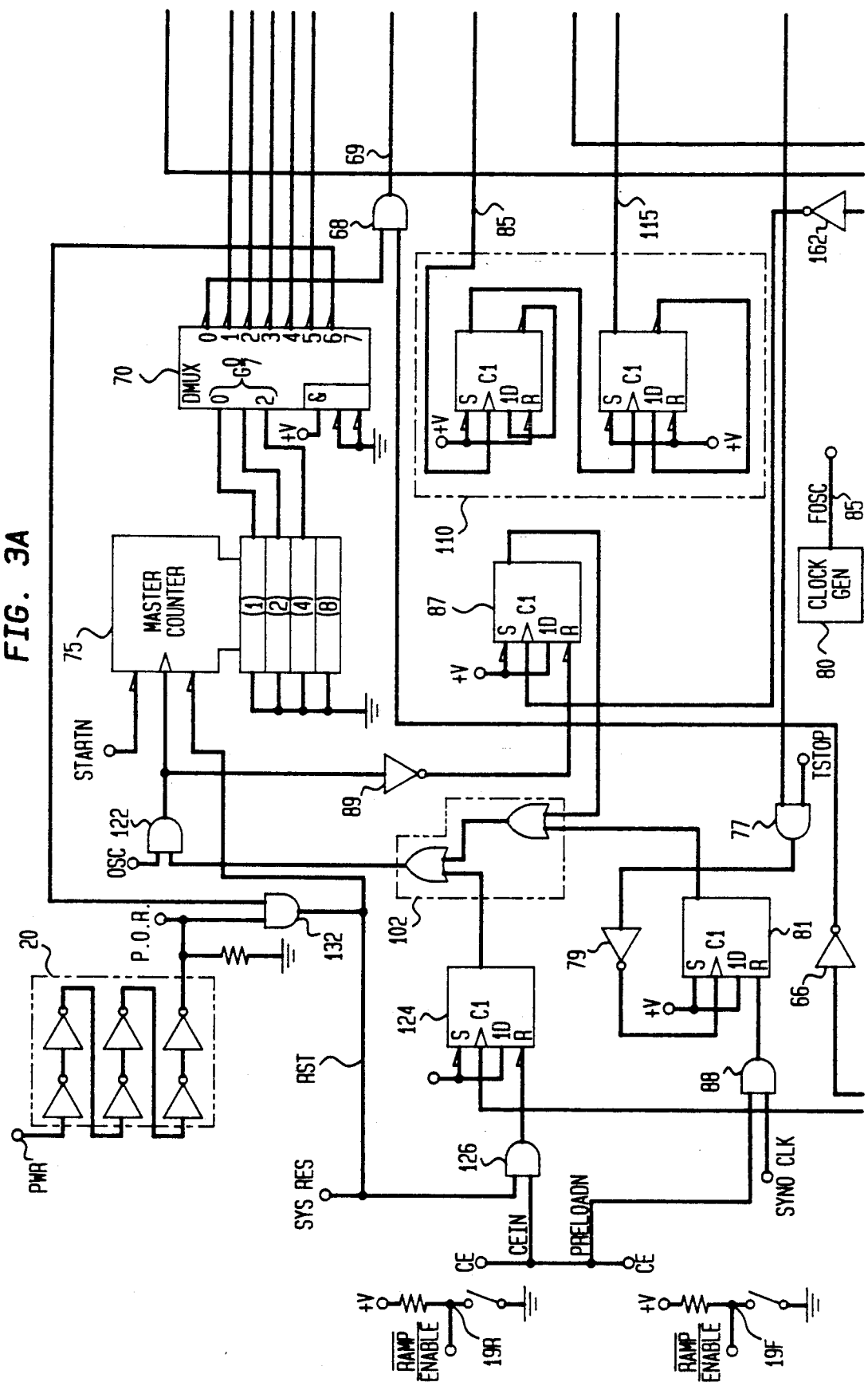
Figure 3B:
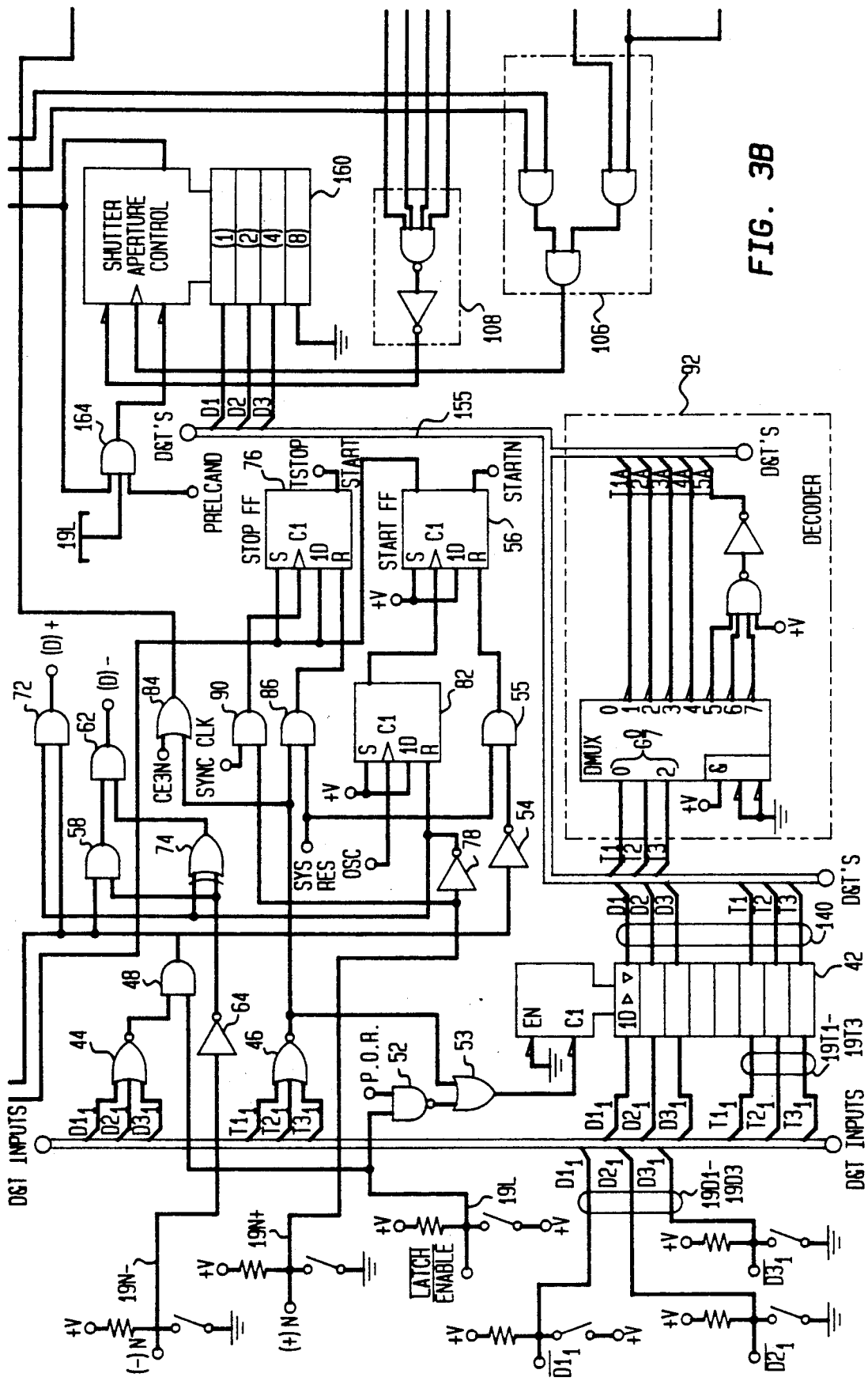

The drive current waveform of FIG. 2 is produced in accordance with the present invention by the shutter actuator control unit 10, shown in FIG. 1, which is comprised of drive current timing generator 17 (a schematic, logic diagram of which is shown in FIGS. 3A and 3B taken together) and current drive circuit 18, which may comprise a pair of conventional bipolar current drivers, one for forward current and the other for reverse current drive of the shutter blade actuator. Drive current timing generator 17 is coupled to an input link 19 through which a plurality of operation-defining control inputs and parameter codes are coupled from an external source (e.g. a set of manually presettable switches or inputs from an intelligent supervisory source (microcontroller)). The shutter parameter-defining codes consist of a target aperture diameter (D numbers) and shutter speed or timing (T numbers). For purposes of providing a non-limitative example, the aperture and shutter speed codes may comprise three bit digital code lines 19D1-19D3, 19T1-19T3, respective values of which are associated with aperture size and shutter speed values tabulated in FIG. 4.

Input link 19 also contains enable inputs 19L, 19R and 19F respectively associated with latch, ramp and flash operations. Whether or not the function is enabled will depend upon the logical state of its input. For purposes of convention, a '0' (GND) input means that the function is enabled, while a '1' (+V) input means that the function is disabled. Positive (+) and negative (−) shutter control inputs are assertable on lines 19N+ and 19N−, respectively. An internally sourced reset signal is derived via a link RST.

The shutter parameter (D and T) codes are coupled to a control parameter latch (register) 42 and to the inputs of respective aperture size code NOR gate 44 and shutter speed code NOR gate 46. The output of NOR gate 44 is coupled to a first input of an AND gate 48, a second input of which is coupled to latch enable input line 19L. Latch enable input line 19L is further coupled to one input of a NAND gate 52, a second input of which is coupled to a cascaded chain of drivers 20, which output a power-on-reset signal POR in response to the application of power at a turn-on terminal PWR.

The output of NAND gate 52 is coupled through OR gate 53 to the clock input of register 42. The output of NOR gate 46 is also coupled to OR gate 53. The enable input EN of shutter control code register 42 is normally coupled to a low logic level (GND), to maintain the latch enabled. On the other hand, as will be discussed below in connection with the stepped aperture mode of operation of the invention, the chip enable input CE of shutter control code register 42 may be controllably de-asserted and then reasserted by an attendant microcontroller to allow previously latched control codes to be updated with new values for the purpose of effecting dynamic shutter control.

The output of AND gate 48 is coupled through inverter 54 to a first input of AND gate 55, a second input of which is coupled to system reset line RST. The output of AND gate 55 is coupled to the reset input of a START flip-flop 56. The output of AND gate 48 is also coupled to a first input of AND gate 58, the output of which is coupled to a first input of AND gate 62. A second input of AND gate 58 is coupled through inverter 64 to line shutter control 19N−. The output of AND gate 48 is further coupled through an inverter 66 to a first input of a PRELOAD N AND gate 68, a second input of which is coupled to the '0' output line of a waveform sequence demultiplexer 70. The output of AND gate 48 is coupled to a first input of AND gate 72, the (D+) output of which is coupled to the (D+) input of a current waveform control circuit 170, to be described below.

The output of inverter 64 is further coupled to a first input of exclusive OR gate 74, the output of which is coupled to a second input of AND gate 62. The (D−) output of AND gate 62 is coupled to the (D−) input of current waveform control circuit 170. A second input of exclusive OR gate 74 is coupled to the output of an inverter 78 to which shutter control line 19N+ is coupled. The output of inverter 78 is further coupled to a second input of AND gate 72 and to the reset input of a flip-flop 82, the Q output of which is coupled to the clock input of START flip-flop 56. The D input of each of flip-flops 56 and 82 is hardwired high (+V). The clock input of flip-flop 82 is coupled to receive a divided-down clock OSC produced on output line 115 from a clock divider circuit 110. Clock divider circuit 110 is driven by a fast oscillator signal FOSC on line 85 from a free running clock circuit 80. (Although the clock signals provided by clock circuit 80 and associated clock divider circuit 110, respectively, are shown as being generated by on-chip components with the timing generator circuitry of FIG. 3A and 3B, they may optionally be provided from an off-chip (external) source.)

The Q output of START flip-flop 56 is coupled to the clock input of a flip-flop 124 and to the set and D inputs of a STOP flip-flop 76, while the QBAR (or START NOT) output of START flip-flop 56 is coupled to the enable input of a successively incremented master counter 75. The clock input of STOP flip-flop 76 is coupled to the output of an AND gate 90. A first input of AND gate 90 is coupled to the output of an inverter 172. A second input of AND gate 90 is coupled to line 19N+. The QBAR output of STOP flip-flop 76 is coupled to a first input of an AND gate 77, the output of which is coupled through an inverter 79 to the clock input of a flip-flop 81.

The output of NOR gate 46 is further coupled to a first input of each of an OR gate 84 and an AND gate 86. The output of OR gate 84 is coupled to the enable input of a set of cascaded 'shutter speed' down counters 230 and 220, while the output of AND gate 86 is coupled to the reset input of STOP flip-flop 76. A second input of OR gate 84 is coupled to receive a (shutter open retention timer) chip enable signal CE3N from demultiplexer 70. A second input of AND gate 86 is coupled to the system reset link RST.

Aperture size (D) and shutter speed (T) codes that have been supplied to and latched into shutter control code register 42 are coupled to the D and T portions of a code link 140. The T portion of code link 140 is coupled to a decoder 92, which decodes the shutter speed code (T) and outputs the decoded value on one of a set of shutter speed lines 150. The aperture size code (D) is coupled over link 155 to the D inputs of an aperture size down counter 160. As will be described below, these latched and decoded D and T values are used to control the operation of a set of down counter circuits through which the shutter actuator control current waveform is defined. The shutter speed lines 150 are coupled to shutter speed down counter 230, the clock input of which is coupled to line 115 to receive the divided clock OSC from clock divider 110. The QBAR output of a shutter speed counter down 220, which is connected in cascade with down counter 230, is coupled to a second input of AND gate 77.

The QBAR output of aperture size counter 160 is coupled to one input of an AND gate 164, the output of which is coupled to reset input of counter 160. A second input of AND gate 164 is coupled to preload line 69. A third input to AND gate 164 is coupled to latch enable input line 19L. The QBAR output of counter 160 is also coupled through an inverter 162 to the clock input of a flip-flop 87, the set and D inputs of which are hardwired high (+V) and the Q output of which is coupled to a first input of an OR gate 102. The reset input of flip-flop 87 is coupled to the output of an inverter 89. The output of OR gate 102 is coupled via AND gate 122 to the clock input of master counter 75. AND gate 122 is clocked in accordance with the divided clock signal OSC on line 115.

OR gate 102 has a second input coupled to the Q output of flip-flop 81. A third input of OR gate 102 is coupled to the Q output of flip-flop 124, the reset input of which is coupled to the output of an AND gate 126.

A first input of AND gate 126 is coupled to chip enable line CE1N and a second input of AND gate 126 is coupled to system reset line RST. The output of AND gate 122 is further coupled to the input of inverter 89. The D and set inputs of flip-flop 81 are hardwired high (+V) and its reset input is coupled to the output of an AND gate 88. A first input of AND gate 88 is coupled to Preload N line 69 and a second input is coupled to a Sync Clk line from the output of an inverter 172, the input of which is the chip enable line CE3N.

The clock input of aperture size counter 160 is coupled to the output of an AND gate 106, while its enable input is coupled to the output of a AND gate 108. AND gate 106 has a set of four inputs respectively coupled to the outputs of I1 counter 102, I2 counter 202, I4 counter 204 and I5 counter 205. These counters are associated with the respective pulse intervals I1, I2, I4 and I5 of the current drive waveform shown to be generated, such as that shown in FIG. 2, reference above, and are enabled by respective chip enable lines CE1N, CE2N, CE4N and CE5N from demultiplexer 70. These chip enable lines are also coupled to the respective inputs of AND gate 108. Each of counters 201, 202 204 and 205 is controllably reset, via AND gates 231, 232, 234 and 235 by the PRELOAD N output 69 line from Preload N AND gate 68 and is clocked by clock signal OSC on line 115 from clock divider 110. In addition, each of counters 201, 202, 204 and 205 has a respective set of MASK inputs to which a count code defined in accordance with the characteristics of the shutter mechanism is coupled. Whenever a counter has counted down to zero from its starting code value, the counter produces an output signal and resets itself through an associated input AND gate which allows the counter to reload the starting count in preparation for another iteration.

The contents of a successively incremented master counter 75 are used as select inputs to demultiplexer 70 for the purpose of defining the state of chip enable output lines CE1N–CE5N. At any given time no more than one of the chip enable lines CE1N–CE5N will be asserted. As will be described below, these chip enable lines are sequentially enabled during the course of the generation of the pulsed format of the drive current waveform.

The system reset line RST is derived from the output of an AND gate 132, a first input of which is resistively coupled to ground (GND) and to the output of a cascaded chain of drivers 20, to an input terminal PWR of which a power supply voltage (+V) is coupled through the operation of a power on switch (not shown). (The cascading of drivers 20 allows a smooth power-up operation by delaying the generation of a reset signal on line RST until all devices of the circuit are 'awake') A second input of AND gate 132 is coupled to the '6' output of demultiplexer 70. The output of AND gate 132 is coupled to the reset input of master counter 75.

Current waveform control circuit 170 includes a first NAND gate 174, respective inputs of which are coupled to receive chip enable signals CE1N, CE3N and CE5N, for controlling the generation of current flow of a first polarity, and a second NAND gate 175, respective inputs of which are coupled to receive chip enable signals CE2N and CE4N, for controlling the generation of current flow of a second polarity. The output of NAND gate 174 is coupled to a first input of AND gate 177, the output of which is coupled to a first input of OR gate 252. A second input of OR gate 252 is coupled to the (D+) line at the output of AND gate 72. The output of OR gate 252 is coupled to a first input of a forward current enable AND gate 256, the output of which is coupled to a forward current drive control line (+DRIVE) and to an inverter 262. A second input of AND gate 256 is coupled to reset line RST, which is also coupled to an input of an AND gate 258. The output of inverter 262 is coupled to a first input of a reverse current output AND gate 259. The output of AND gate 259 is coupled to a reverse current drive control line (−DRIVE).

A second input of AND gate 177 is coupled to the output of an AND gate 152 a first input of which is coupled to Preload N line 69 and a second input of which is coupled to the Q Bar output of a flip-flop 158. Preload N line 69 is also coupled to one input of an AND gate 179, a second input of which is coupled to the output of NAND gate 175. The output of AND gate 179 is coupled to one input of an OR gate 254, a second input of which is coupled to the (D−) output of AND gate 62. The output of OR gate 254 is coupled to a first input of an AND gate 258, a second input of which is coupled to system reset line RST. The output of AND gate 258 is coupled to a second input of reverse current AND gate 259.

Control of the ON and OFF portions (which define the duty cycle) of the shutter opening holding current is governed by a pair of cross-coupled duty cycle-defining down counters, specifically an I3-ON down counter 180 and an I3-OFF down counter 190. Down counters 180, 190 are cross-coupled such that, for the duration of the holding pulse sequence, as one counter down counts to zero and resets, the other counter begins counting down from its initial value, For this purpose, the Q output of counter 190 is coupled over line 191 to a first input of an OR gate 169, the output of which is coupled to the clock input of flip-flop 166. A second input of OR gate 169 is coupled to the Q output of flip-flop 168. The D and set inputs of flip-flop 168 are hardwired high. The clock input of flip-flop 168 is coupled to the Sync Clk output of inverter 172 to which chip enable line CE3N is applied. The Sync Clk output of inverter 172 is also coupled to one input of an AND gate 186, the output of which is coupled to the reset input of a flip-flop 158 and to the reset input of down counter 190. The other input of AND gate 186 is coupled to the Q Bar output of I3 down counter 190.

The QBAR output of flip-flop 166 is coupled to the enable input of I3-ON down counter 180. The Q output of counter 180 is coupled to the clock input of flip-flop 158, the QBAR output of which is coupled to AND gate 152 and to the enable input of down counter 190 via line 153. The QBAR output of counter 180 is coupled to one input of AND gate 178, the output of which is coupled to the reset input of each of flip-flops 166 and 168 and the reset input of down counter 180. A second input of AND gate 178 is coupled to Preload N line 69.

Each of down counters 180 and 190 is clocked by the clock signal FOSC on line 85 at the output of clock generator 80. The initial values from which counters 180 and 190 must count down before generating an output signal are complements of each other and are established by the output links of a multiplexer 192, including an associated set of inverters 222, 224, 226, 228. Multiplexer has two sets of plural (e.g. four) inputs, one of which is coupled to the D's code line 155 and the other of which is coupled to shutter speed down counter 220. The output lines from multiplexer 192 are coupled directly to the count control inputs of I3-ON down counter 180 and through a set of inverters 222, 224, 226 and 228 to the count control inputs of I3-OFF down counter 190. Which set of inputs (aperture size or shutter speed counter-sourced inputs) multiplexer 192 couples to counters down 180 and 190 is determined by the logical state of RAMP enable line 19R. When RAMP enable is asserted low, multiplexer 192 passes the count value of counter 220; otherwise the aperture size codes 19D1-19D3 are coupled to counters 180 and 190. Because the aperture size codes are three bit codes they are coupled to the three most significant bit inputs to multiplexer 192. The least significant input of multiplexer 192 of the set of input lines associated with the aperture size code lines 19D is hardwire low.

Upstream of down counter 220 is a shutter speed control down counter 230, the Q output of which is coupled to the clock input of counter 220 and the QBAR output of which is coupled to a first input of an associated 'reset' AND gate 233. A second input of AND gate 233 is coupled to PRELOAD N line 69 and its output is coupled to the reset input of counter 230. The count code inputs of counter 230 are coupled to the shutter speed lines 150 from decoder 92. The enable inputs of each of down counters 220 and 230 are coupled to the output of OR gate 84 to one input of which chip enable line CE3N is applied, as described previously. The clock input of counter 230 is coupled to receive clock signal OSC on divided clock line 115 from clock divider 110.

An auxiliary circuit, in the form of a synchronized flash control circuit is formed of a NAND gate 282, a first input of which is coupled to counter enable line CE4N and a second input of which is coupled through an inverter 281 to flash enable line 19F. The output of NAND gate 282 is coupled to the clock input of flip-flop 283, the D and set inputs of which are hardwired high and the reset input of which is coupled to PRELOAD N line 69. The Q output of flip-flop 283 is coupled to FLASH SYNC output line 285.

OPERATION

The programmable sequencer circuit of FIGS. 3A and 3B is capable of operating in a variety of different modes depending upon the amount of functionality to be performed by the internal counter circuitry and that which is to be performed by a separate supervisory mechanism. Where the full functionality of the internal counters is employed, circuit operation is dictated by the control logic and chosen parameter settings (shutter speed and aperture size). Where increased versatility is desired, various aspects of the control functionality of the internal logic are by-passed, so that the shape of the drive current waveform may be governed by an external (intelligent) source.

MODE 1

Internal Control With Constant Valued Opened Shutter Holding State

In accordance with a first mode of operation, in which all of the control functionality of the internal logic is employed, the shutter actuator sequence is executed in accordance with a presettable aperture size and shutter spaced, which causes the shutter to be opened to a predefined target aperture, held at that aperture and then closed. An example of the pulse sequence through which this series of events is carried out is that shown in FIG. 2, referenced previously.

Figures 4, 5:
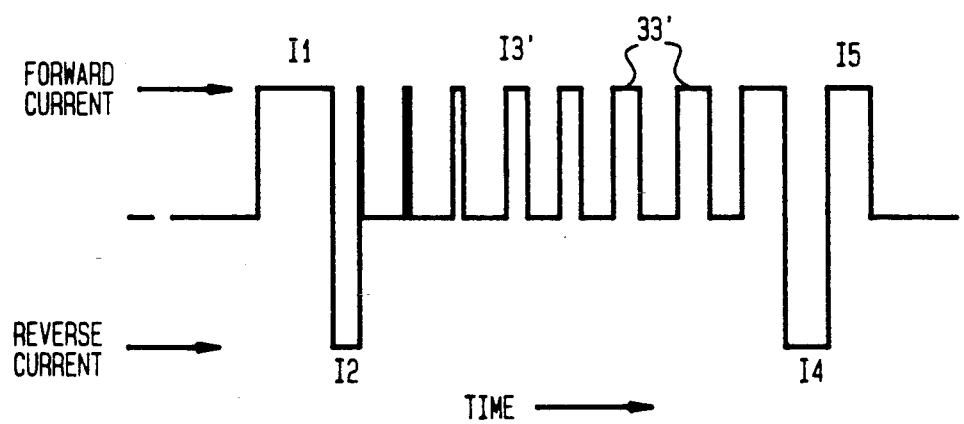
FIG. 4 sets forth a tabulation of aperture and shutter speed codes used in connection with the operation of the shutter actuator control circuit of FIG. 3.
FIG. 5 shows the waveform of a pulsed drive current for an electromagnetically driven shutter mechanism, employing a ramped opening pulse sequence.

As described above, shutter parameter-defining codes consist of a target aperture diameter (D numbers) and shutter speed (T numbers) which, in the illustrated embodiment, comprise three bit digital code lines 19D1-19D3, 19T1-19T3, respective values of which are associated with aperture size and shutter speed values tabulated in FIG. 4. These code values may be preset, for example, by the operation of a set of rotary dial switches referenced to a film DX number. For fixed parameter values, the D number and T number signal lines may be selectively tied to V+ and GND. Also, the LATCH ENABLE line 19L and line 19N+ may be resistively coupled to a prescribed default voltage terminal (+V).

Figure 3C:
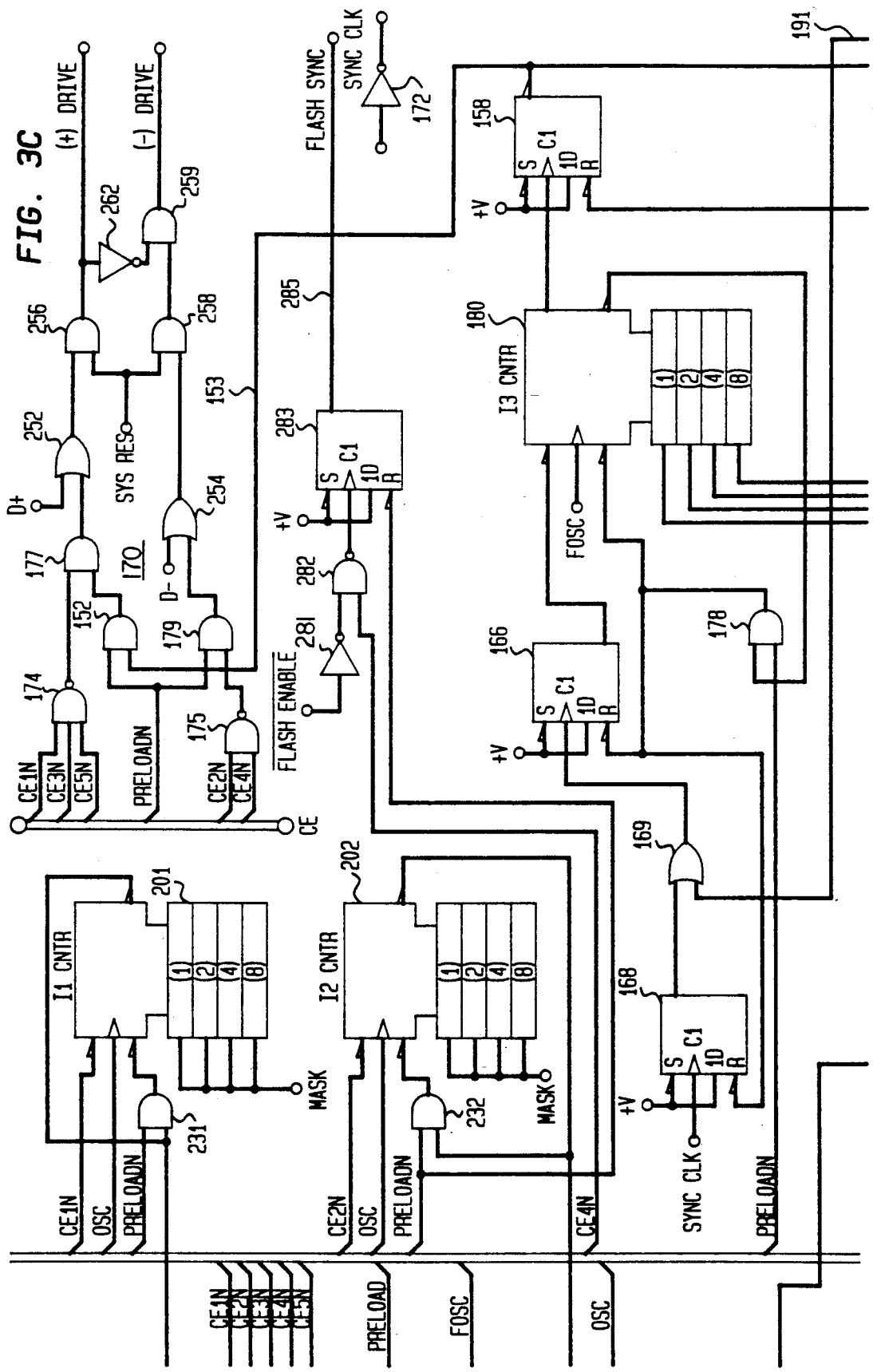

In accordance with this first mode of operation it will be assumed that an associated auxiliary mechanism, such as a flash device, is to be triggered. As will be described below, the flash signal is generated when the shutter is fully opened and immediately prior to its closing (at the beginning of closure acceleration interval I4 in FIG. 3), thus assuring maximum lighting of the subject and avoiding the possibility of the film capturing the subject's blinking in response to the flash. When the flash is to be used, a switch on the flash unit (not shown) is set to the flash position. The FLASH ENABLE line 19F is coupled to this switch, so that, via inverter 281, one input of NAND gate 282 within the flash trigger circuit is high. If the flash switch is not set to the flash enable position, then the output of inverter 281 remains low and the output of NAND gate 282 is held high, so that FLASH flip-flop 283 cannot be clocked and no flash trigger signal will be generated.

Prior to the circuit being powered up by the closure of a power switch (not shown) to an associated power supply (+V and GND power supply terminals), a low voltage (GND) is applied to the input PWR of cascaded inverters 20, so that the reset line RST at the output of Power Reset AND gate 132 is held low by the resistively coupled ground connection to one of the gate's inputs. Since the output of AND gate 132 is low, the chip enable input of master counter 75 is low, so that the master counter is reset. As a consequence, all of the outputs of demultiplexer 70 are high, so that one input of AND gate 132 is high, awaiting a power-up condition on the second input. Also, since all chip enable outputs CE1N-CE5N of demultiplexer 70 are high, all of the counting circuitry is currently disabled.

When the power switch is closed, +V and GND are applied to various components of the circuit, causing mask input codes to be loaded into the respective timing counters. In the present example, each of shutter opening down counters 201 and 202 and shutter closing counters down 204 and 205 will be preloaded with mask data that have been predefined based upon the physical parameters of the shutter for the frequency of the clock signals used, to define shutter opening and closing times. As pointed out above in connection with the description of FIG. 2, the shutter blades are opened against a spring bias and closed with the aid of this bias. These blade inertia and spring force components are employed in setting the mask values for the opening and closing counter codes.

After propagating though inverters 20, the +V input to cascaded inverters 20 is coupled to power-on-reset AND gate 132, causing its output line RST to be asserted high. The high assertion on line RST removes the hard clear input to master counter 75 and causes the output of AND gate 126 to go high, thereby removing its hard reset input to flip-flop 124. The system reset line RST stays high through the first five cycles of the master counter, as will be described below.

The power-on-reset signal POR at the output of cascaded inverters 20 also causes the outputs of NAND gate 52 and OR gate 53 to go low, thereby clocking shutter aperture size (D) and opening duration (T) codes into shutter control code register 42. These (D and T) codes are also coupled to the inputs of respective NOR gates 44 and 46 which produce outputs only if the codes are all zeros, corresponding to a mode in which a supervisory source is to control aperture size and will use both edges of the shutter actuation signal. In the present mode (MODE 1), each of the D and T codes is one of the non-zero values of the FIG. 4. Thus, the zero output of NOR gate 44 disables AND gate 48 which, in turn, causes AND gates 58, 62 and 72 to be disabled, so that the (D+) and (D−) inputs to OR gates 252 and 254 are low, indicating that the drive current will not be controlled by an external source. Similarly, the zero output of NOR gate 46 maintains the output of AND gate 86 low, so that a hard reset is applied to stop flip-flop 76. The low output of AND gate 48 is inverted high by inverters 54 and 66, so as to enable one input of each of AND gates 55 and 68. The hard reset input to START flip-flop 56 is removed, so that start flip-flop 56 may respond to shutter button actuation. Also, with one of the inputs of AND gate 68 enabled, when master counter 75 transitions from the reset state, its '0' output will go high and the output of AND gate 68 will go high. The current low output of AND gate 68 provides a reset to each timing counter.

When the camera shutter button is actuated, line 9N+ is pulled low, which, via inverter 78, removes the hard reset input to flip-flop 82, which ensures synchronous timer circuit operation. At the next clock output OSC from divider 110, the Q output of flip-flop 82 is clocked high, which, in turn clocks START flip-flop 6, so that its Q output (START) goes high and its QBAR output (STARTN) goes low, the latter state enabling master counter 75. The high transition on the Q output of START flip-flop 56 clocks flip-flop 124, so that its Q output goes high, to provide an enable logic level through OR gate 102 to one input of AND gate 122. At the next OSC clock signal, master counter 75 is incremented from its reset or '0' state to a count of '1', corresponding to interval I1 in the timing diagram of FIG. 2, by the output of AND gate 122. Also, flip-flop 87 is reset via inverter 77.

When master counter 75 is incremented from '0' to '1', the '0' output of demultiplexer 70 goes from low to high, so that the output of Preload N enable AND gate 68 goes high and chip enable line CE1N is asserted low. The assertion of a low logic state on chip enable line CE1N enables counter 201 and thereby initiates counting interval I1. Within current waveform control circuit 170, the assertion of a low logic level on chip enable line CE1N causes the output of NAND gate 174 to go high, thereby enabling forward current AND gate 256, which goes high and, via inverter 262, disables reverse current AND gate 259. The high output of AND gate 256 is coupled as a forward current assert signal at the (D+) output terminal of current waveform generator 170, so that the associated current driver applies a constant magnitude forward current to the shutter actuator and the shutter is accelerated from its closed position toward its target open aperture.

With the assertion of a low logic level on chip enable line CE1N, the output of AND gate 126 goes low, thereby applying a hard reset input to flip-flop 124, so that flip-flop 124 is reset and a continuous high logic level is no longer applied from flip-flop 124 to the non-clock input of AND gate 122. Removing the effect of flip-flop 124 permits subsequent clocking of master counter 75 to proceed in accordance with the intended sequencing of counter intervals I1 . . . I5, rather than the unintended clocking that would otherwise be provided by the OSC clock on line 115, if AND gate 122 was continuously enabled by flip-flop 124.

The assertion of a low logic level on chip enable line CE1N also causes the output of AND gate 108 to go low, so that aperture size down counter 160 is enabled. As OSC clock signals on line 115 are applied to down counter 201, the counter is decremented from its previously loaded mask value. Upon counting down to zero, counter 201 generates an output signal and resets. This output signal is coupled through AND gate 106 and clocks aperture size counter 160. The output signal is also coupled through AND gate 231 to reset I1 counter 201 back to its mask value.

I1 counter and aperture size counter 160 continue to be decremented in this manner, until counter 160 is eventually counts down from its original aperture size D code on aperture size code link 155 to zero. Upon counting down to zero, down counter generates an output signal, which is coupled through inverter 162 to clock the Q output of flip-flop 87 high, causing master counter 75 to be incremented from its current '1' count to a count of '2'. Via AND gate 164, down counter 160 is reset, so that it may begin counting at the aperture size D code supplied on link 155.

With the contents of master counter 75 now sequenced to a value of '2', demultiplexer 70 outputs a low level on chip enable line CE2N, thereby terminating acceleration opening interval I1 and initiating shutter braking interval I2. The assertion of a logical low level on count enable line CE2N does two things. First, it causes the output of NAND gate 175 within current waveform control circuit 170 to go high, so that the output of AND gate 179 goes high and enables AND gate 258. The output of AND gate 258 enables reverse current AND gate 259. (Inverter 262 has changed state (output low) with chip enable line CE1N going high).

Secondly, it starts the action of I2 counter 202, which proceeds to operate in the same manner as counter 201 described above. Namely, each time counter 202 counts down to zero from its ask code, it generates an output signal which causes aperture size counter 160 to be decremented. The output signal is also fed back to AND gate 232 so that I2 counter 202 is reset. I2 down counter 202 and aperture size down counter 160 continue to be decremented in this manner until down counter 160 has counted down to zero from the aperture size code on link 155, whereupon counter 160 again generates an output signal which is coupled inverter 162, clocking flip-flop 87 and bumping master counter 75 from '2' to '3'.

With the contents of master counter 75 now sequenced to a value of '3', demultiplexer 70 outputs a low logic level on chip enable line CE3N, to terminate braking interval I2 (count enable line CE2N goes high) and initiate shutter holding interval I3. The de-assertion of chip enable line CE2N causes the output of NAND gate 175 to change state, so that reverse current AND gate 259 is disabled, thereby terminating reverse current flow.

The assertion of a logical low level on chip enable line CE3N causes inverter 172 to assert a logical high transition on its Sync Clk output line, thereby clocking flip-flop 168, the Q output of which, in turn, goes high, clocking flip-flop 166 through OR gate 169. The QBAR output of flip-flop 166 goes low, enabling I3-ON counter 180. For MODE 1 operation, the ramp enable input to multiplexer 192 is not invoked, so that multiplexer 192 outputs the aperture size D code on link 155, for establishing the duty cycle of the shutter holding current.

Since I3-ON counter 180 is initially reset, the QBAR output flip-flop 158 is high, so that AND gate 152 within current waveform control circuit 170 is enabled. As a consequence, with chip enable line CE3N asserted low, both inputs to AND gate 177 within current waveform control circuit 170 are high, so that the output of AND gate 256 goes high, and forward current is again applied to the shutter actuator.

Counter 180 is decremented from the value output by multiplexer 192 in response to fast clock signals FOSC generated by clock 80. When the count value within I3-ON counter 180 is decremented to zero, its Q output 180 transitions high, which clocks flip-flop 158, causing its QBAR output to go low, thereby disabling AND gate 152 and terminating forward holding current. The QBAR output of counter 180 also goes low, which causes the output of AND gate 178 to go low and reset counter 180. This low transition output of AND gate 178 also resets flip-flops 168 and 166.

Since the QBAR output of flip-flop 158 has transitioned low, I3-OFF counter 190 is now enabled and begins counting fast clock signals FOSC. When the count value within I3-OFF counter 190 is decremented to zero from its initial code value, associated with the OFF period of the pulsed holding current, namely the complement of the output of multiplexer 192, its Q output goes high, thereby clocking flip-flop 166 and causing I3-ON counter 180 to be again enabled. Also, via gate 186, the change in state of its QBAR output resets counter 190 and flip-flop 158. Since flip-flop 158 is now reset, its QBAR output once again enables AND gate 152, so that forward holding current is again applied. This alternate enabling/disabling of counters 180 and 190 continues until the period of time defined by the shutter speed timing code (T) applied over line 150 to shutter speed counter 230 has expired.

More particularly, when chip enable line CE3N goes low at the beginning of shutter open-holding interval I3, both inputs to OR gate 84 are low, so that its output is low, thereby enabling each of cascaded down counters 230 and 220. When counter 230 has counted down to zero from its initial shutter speed code defined by its (T) inputs, in response to receipt of successive OSC clock pulses on line 150, counter 230 rolls over, being reset via AND gate 233, and its Q output clocks counter 220.

Counter 220 is sequentially decremented from an initial hardwired value by the successive changes in state of the Q output of counter 230. When counter 220 counts down to zero, its QBAR output goes low, causing the output of AND gate 77 to transition low. The high to low transition at the output of AND gate 77 is inverted by inverter 79, so that flip-flop 81, which had previously been cleared, is now set, whereby its Q output goes high, supplying an enable input to AND gate 122. At the next OSC clock, the output of AND gate 122 goes high, thereby incrementing master counter 75 from a count of '3' to '4'. Chip enable line CE3N goes high, terminating the shutter open holding interval I3, while chip enable line CE4N goes low, enabling counter 160 and I4-ON counter 204.

With the assertion of counter enable line CE4N, AND gate 258 within current waveform control circuit 170 is again enabled, so that the associated current driver applies a constant magnitude reverse current to the shutter actuator and the shutter is accelerated from its open position toward its closed position. The assertion of counter enable line CE4N also clocks flash flip-flop 283, so that if the FLASH ENABLE feature has been asserted via line 19F, a flash trigger signal is generated in coincidence with the beginning of the shutter closure period.

As pointed out previously, triggering the flash when the shutter is fully opened and immediately prior to its closing assures maximum lighting of the subject and effectively prevents the film capturing the subject's blinking in response to the flash. If FLASH ENABLE line 19F has not been asserted, then AND gate 282 is disabled and flip-flop 283 will not be clocked by chip enable line CE4N, so that no FLASH SYNC signal is generated.

Chip enable line CE4N also enables I4-ON counter 204, so that it is successively decremented from an initial mask code by OSC clock signals on line 115. Upon counting down to zero, counter 204 generates an output signal and resets. The output signal from counter 204 is coupled through AND gate 106 and clocks aperture size counter 160. As described above in connection with the operation of counters 201 and 202, aperture size counter 160 continues to be clocked in this manner until its count value has been counted down to zero from the aperture size D code on link 155, whereupon counter 160 generates an output signal, which resets the counter (via AND gate 164) and is coupled through inverter 162 and OR gate 102 to again increment master counter 75 (here from a count of '4' to a count of '5'2). Via AND gate 234, counter 204 is reset.

With the contents of master counter 75 now sequenced from a count of '4' to a count of '5', demultiplexer 70 outputs a low level on chip enable line CE5N, to terminate shutter close acceleration interval I4 and initiate braking interval I5. The assertion of chip enable line CE5N causes the output of NAND gate 174 to go high, so that the output of AND gate 256 goes high, thereby initiating a shutter braking current. In addition, it starts the action of I5 counter 205, which proceeds to operate in the same manner as counter 204 described above. Each time counter 205 counts down to zero, it causes aperture size counter 160 to be decremented. Thus, as I5 counter 205 is successively decremented to zero by clock signals on line 115, it generates an output signal and resets. Its output signal is coupled through AND gate 106 and clocks aperture size counter 160. Aperture size counter continues to be decremented in this manner until its count value has been counted down to zero from the aperture size D code on link 155, whereupon counter 160 again generates an output signal, which is coupled through inverter 162 and OR gate 102 to increment master counter 75 to a value of '6', and also causes counter 160 to be reset.

With the contents of master counter 75 sequenced to a value of '6', demultiplexer 70 now pulls its '6' input to AND gate 132 low, resetting master counter 75 and pulling the system reset line RST low, so as to reset the system and terminate the shutter sequence. With master counter 75 now reset, its '0' output goes low, disabling preload N AND gate 68, and pulling all counter preload N inputs low. Further, the system reset line going low also causes demultiplexer 70 to switch its '6' output high again, re-asserting system reset high.

MODE 2

External Control of Shutter Speed

In accordance with a second mode of operation, the shutter aperture size is defined in accordance with the D number codes, as in the first mode; however, shutter speed is controlled by way of external source, rather than in accordance with the T number codes. Thus, the opening and closing sequences of counter enable intervals I1, I2 and I4, I5 proceed as in the first mode, described above. However, the duration of the shutter holding interval I3, which extends between the termination of opening braking interval I2 and the start of closing interval I4, is driven by control signals externally applied to the shutter actuation input 19N+.

More particularly, for this second mode of operation, the T number code is all zeros, as tabulated in FIG. 4, so that the output of NOR gate 46 is asserted high. Upon the assertion of a system reset on line RST, the output of AND gate 86 will therefore be asserted high and the hard reset input to STOP flip-flop 76 is removed. Since the output of NOR gate 46 is asserted high, the output of OR gate 84 is also high, so that shutter speed counters 230 and 220 are disabled.

The shutter operation is initiated by the depression of the shutter button, which pulls control line 19N+ low, and the operation proceeds through shutter opening intervals I1 and I2 in the same manner as in the first mode described previously, to bring the shutter to its target aperture. Upon the termination of shutter opening braking interval I2, master counter 75 sequences to its next count value '3', which causes counter enable line CE3N to be asserted low, whereby the Sync Clk output of inverter 172 goes high, enabling one input of AND gate 90.

As in the first mode, there is again an alternate enabling of duty cycle counters 180 and 190 to provide the requisite shutter holding current. Chip enable line CE3N continues to be asserted low. The shutter is maintained in its open position as long as shutter actuator line 19N+ is asserted low. When the shutter button is released, line 19N+ transitions high, so that the output of AND gate 90 transitions from low to high, thus clocking STOP flip-flop 76, whereby its QBAR output goes low. As a result, the output of AND gate 77 goes low, clocking flip-flop 81 and causing master counter 75 to be incremented from a count of '3' to a count of '4', thereby terminating the shutter holding state. Again, as in the first mode, when master counter 75 is incremented to a count of '4', the assertion of chip enable line CE4N also clocks flash flip-flop 283, so that if the FLASH ENABLE feature has been asserted via line 19F, a flash trigger signal is generated in coincidence with the beginning of the shutter closure period. The closure of the shutter then proceeds in the same manner as mode 1 described above.

MODE 3

External Control of Shutter Speed and Aperture Size

In accordance with a third mode of operation, both the shutter aperture size and speed are controlled by way of an external source, rather than in accordance with the D and T number codes. The duration of each of the opening and closing intervals I1, I2 and I4, I5 is determined by external control signals applied to shutter control lines 19N+ and 19N−. Similarly, the duration of the shutter holding interval I3, which extends between the termination of braking interval I2 and the start of closing interval I4, is driven by control signals externally applied to the shutter actuation input line 19N+.

More particularly, for this third mode of operation, each of the D and T number codes is all zeros, as tabulated in FIG. 4, so that the output of each of NOR gates 44 and 46 is asserted high. With the output of NOR gate 44 asserted high, the output of AND gate 48 will be asserted high, and a first input of each of AND gates 58 and 72 will be asserted high. Since AND gates 58 and 72 are coupled to auxiliary control inputs of OR gates 254 and 252 of current waveform control circuit 170, the states of the second inputs of AND gates 58 and 72, in accordance with input lines 19N+ and 19N−, will determine the application of forward and reverse current to the shutter actuator. Via inverter 54, the high output of AND gate 48 is asserted low at one input of AND gate 55, so that START flip-flop 56 is held reset, thereby preventing master counter 75 from being enabled. As a result, current waveform control circuit 170 is controlled exclusively by drive signals on line 19N+ and 19N−.

MODE 4

Internal control With Ramped Opening of Shutter

In accordance with a fourth mode of operation, the shutter actuator sequence is such that it initially opens the shutter to a preliminary open position and then increases (ramps up) the aperture size from that point unit the shutter reaches a target aperture, whereupon the shutter closes. An example of a pulse sequence through which this series of events is carried out is shown in FIG. 5. The pulse sequence shown in FIG. 5 differs from the pulse sequence shown in FIG. 4 in that the duty cycle of forward current pulses 33' increases with time, thereby causing an increasing forward drive current to be applied to the shutter actuator.

As described above in connection with the first mode of operation, shutter parameter-defining codes consisting of a target aperture diameter (D numbers) and shutter speed (T numbers) are employed. However, in accordance with the fourth mode of operation, the D codes specify a preliminary, reduced diameter aperture size to which the shutter is initially opened. The T codes specify the length of time that the shutter is to be opened further from that preliminary position and thereby define the final aperture size that will be reached at the end of the further opening interval.

As in the first mode, an auxiliary action, such as a flash mechanism, is selectively enabled in accordance with the state of the FLASH ENABLE line 19F. If enabled, an auxiliary (flash) signal is generated when the shutter has reached its fully opened position and begins to be driven closed (at the beginning of closure acceleration interval I4).

The fourth mode of operation differs from the first mode by the values of the control parameters and the fact that the RAMP ENABLE line 19R is invoked. With line 19R invoked, multiplexer 192 couples the contents of counter 220 as the duty cycle control inputs, rather than controlling the duty cycle of the holding current in accordance with the aperture size code on line 155, as in the previous modes 1-3. During the assertion of CE3N low, the counting durations of T3-ON counter 180 and T3-OFF counter 190 will be complementarily ramped by the contents of counter 220, so as to produce the varying duty cycle holding pulses 33', shown in FIG. 5. Thus, the fourth mode of operation is effectively the same as that of the first mode, described above, except for what takes place when chip enable line CE3N is asserted low.

MODE 5

Dynamically Modified Aperture Size

In each of the above described modes of operation of the present invention, the final aperture size to which the shutter is opened is defined at the time that the aperture size (D) control codes and the shutter speed (T) control codes are initially latched into shutter control code register 42 for application to the respective control counters of the system. In accordance with a further (fifth) mode of operation of the present invention, the shutter aperture size is dynamically alterable by an associated control processor, so that the shutter may be opened in a stepwise manner to a first aperture size and thereafter further increased to a second aperture size.

For this purpose, the Sync Clk output of inverter 172, which is coincident with the termination of the initial shutter opening period defined by the sum of time intervals I1 and I2 and is associated with the CE3N enable signal generated by master counter 75, is monitored by an associated control processor. When Sync Clk goes high at the start of the shutter holding interval I3, the control processor responds by removing the latch enable signal on line 19L and also supplying a new (larger aperture size) D code to shutter control code register 42. The latch enable signal is then reasserted on line 19L, so that the updated D code is loaded into register 42 and thereby applied to aperture size counter 160 and multiplexer 192. The reassertion of a latch enable input to AND gate 164 causes the original aperture size code to be replaced with the updated D code. With the larger aperture size code now applied to multiplexer 192, the duty cycle of the shutter open-holding pulses is increased. Thus, the current drive to the shutter actuator will be larger than that required to hold the shutter at its present aperture size defined by the previously latched D code.

This increased drive current will cause a further opening of the shutter against the normal shutter closing (spring) bias until there is equilibrium between the closing bias and the increased duty cycle of the holding current. The shutter will remain in this new, larger size aperture state until the expiration of the opening interval I3, namely until the CE3N line is de-asserted, and master counter 75 is incremented, causing the CE4N line to be asserted low. Since aperture size counter 160 contains the newly latched (larger aperture size) D code, the operation of counters 204 and 205 will be referenced to a larger time interval, so that the requisite increased closing acceleration and braking current will be generated during time intervals I4 and I5, respectively.

Figure 6:
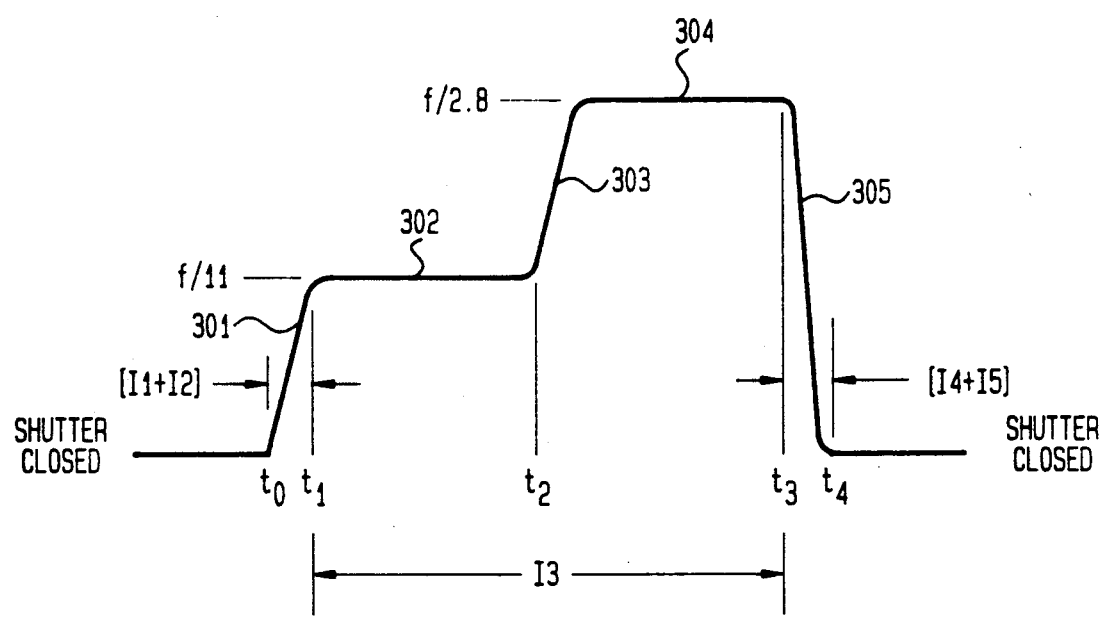
FIG. 6 diagrammatically shows the operation of the invention for effecting a stepped shutter aperture size increase.

Because an external supervisory source (microcontroller) controls both the point in time and the magnitude of the increase in aperture size, it is implicit that the shutter speed (T) code, which specifies the length of opening interval I3, is sufficient to accommodate the aperture size increase, as diagrammatically illustrated in the timing diagram of FIG. 6, which shows an example of the fifth mode of operation of the invention for a shutter aperture size increase from an initial aperture value A1 (e.g. f11) to a larger aperture value A2 (e.g. f2.8).

At the start of the shutter opening interval (I1+I2) at time t0, line CE1N is asserted low by master counter 75 and the shutter is opened (301) to an initial aperture size (302) defined by an initial aperture size control code D1, which has been latched into register 42 along with the shutter speed code T, just as occurs in the first mode of operation. At the end of the shutter opening interval, namely upon master counter 75 asserting CE3N low, the Sync Clk output of inverter 172 goes high as a flag to the microcontroller at time t1. A soft-timer within the microcontroller then counts out to a predetermined count during the assertion of CE3N low. At this time latch enable is de-asserted, and a new aperture size code D2 is placed on the control code bus. At time t2, latch enable is again asserted on line 19L, so that the new D2 code is applied to aperture size counter 160 and multiplexer 192, as described above. With the new larger aperture size code D2 now applied to multiplexer 192, the duty cycle of the shutter open holding pulses is increased, causing a further opening (303) of the shutter against the normal shutter closing (spring) bias, until there is equilibrium between the closing bias and the increased duty cycle of the holding current. The shutter will remain in this new, larger size aperture (304) until the expiration of the opening interval I3, namely until the CE3N line is de-asserted, and master counter 75 is incremented, at time t3, whereupon the CE4N line is asserted low. Since aperture size counter 160 has been updated with the larger aperture size D2 code, the operation of counters 204 and 205 is referenced to a larger time interval, so that an increased closing acceleration and braking current will be generated (305), to return the shutter to its original closed position at time t4.

As will be appreciated from the foregoing description, the present invention provides a counter-based scheme for controlling the opening and closing of a camera shutter, which contains a multipurpose interface circuit through which the control current for operating an electromagnetically driven shutter actuator may be precisely defined throughout the shutter actuation sequence (open, hold and close) by means of sequence of pulsed current components which cause the shutter actuator to open the shutter to a specified aperture size, hold the shutter open at that target aperture in accordance with the desired shutter speed, and then return the shutter to its closed position. In order to make the shutter operation adaptive to a variety of control applications, the operational functionality of the clock signal counter unit is selectively controllable in accordance with external control signals applied thereto. In particular, the operational functionality of the clock signal counter unit is controllable in dependence upon prescribed values of the shutter speed and aperture size control codes, thereby affording optional manual and processor-based supervision of shutter operation.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. For use with a shutter control mechanism, said shutter control mechanism having a shutter actuator control circuit for supplying actuator drive current to a shutter actuator for controlling the opening and closing of the shutter, said actuator drive current containing a plurality of successive components which cause said shutter actuator to bring said shutter to a predetermined open position, hold said shutter in its open position, and subsequently return said shutter to its closed position, an apparatus for controlling the respective durations of the plurality of successive components of said actuator drive current comprising:

a clock signal counter unit coupled to controllably count clock signals supplied thereto and producing output signals in accordance with prescribed relationships among numbers of clock signals counted thereby and control codes supplied thereto representative of shutter aperture size and shutter speed; and a control circuit, coupled to said clock signal counter unit, for controlling the generation of the respective components of said actuator drive current in accordance with output signals produced by said clock signal counter circuit, and wherein said actuator drive current contains a sequence of variable duty cycle pulses which causes said shutter actuator to hold said shutter in its open position.

2. An apparatus according to claim 1, wherein that one of said successive components of said actuator drive current which causes said shutter actuator to bring said shutter to its open position comprises a first current pulse of a first polarity and a first duration, which drives said shutter actuator to accelerate said shutter from its closed position toward a predetermined open position, and a second current pulse of a second polarity and a second duration, which drives said actuator to brake the opening of said shutter so that said shutter is brought to said predetermined open position.

3. An apparatus according to claim 2, wherein that one of said successive components of said actuator drive current which causes said shutter actuator to hold said shutter in its open position comprises a sequence of third current pulses of said first polarity and a third variable duration.

4. An apparatus according to claim 3, wherein that one of said successive components of said actuator drive current which causes said shutter actuator to close said shutter from said predetermined open position comprises a fourth current pulse of said second polarity and a fourth duration which causes said shutter actuator to accelerate said shutter from said predetermined open position toward its closed position, and a fifth current pulse of said first polarity and a fifth duration which drives said actuator to brake the closing of said shutter so that said shutter is brought to its closed position.

5. An apparatus according to claim 1, wherein said clock signal counter unit comprises a plurality of counter circuits respectively associated with the components of said actuator drive current, and being coupled to count respective pluralities of clock signals in accordance with said control codes and thereby define the respective durations of the successive components of said actuator drive current.

6. An apparatus according to claim 1, further including an auxiliary device control circuit for controllably synchronizing the operation of an auxiliary device, said auxiliary device control circuit including means, coupled to said clock signal counter unit, for generating an auxiliary device control signal for operating said auxiliary device in synchronism with the generation of one of said output signals.

7. An apparatus according to claim 1, further including means for selectively controlling the operational functionality of said clock signal counter unit in accordance with external control signals applied thereto.

8. An apparatus according to claim 7, wherein said selectively controlling means includes means for selectively by-passing prescribed clock signal counting operations of said clock signal counter unit and providing control of characteristics of output signals produced thereby in accordance with externally applied signals, whereby said control circuit controls the generation of the respective components of said actuator drive current in dependence upon said externally applied signals.

9. An apparatus according to claim 8, wherein said selectively controlling means includes means for selectively by-passing clock signal counting operations of said clock signal counter unit and providing control of characteristics of output signals produced thereby under the exclusive control of externally applied signals, whereby said control circuit controls the generation of the respective components of said actuator drive current in accordance with said externally applied signals and exclusive of counting of clock signals produced by said clock signal generator circuit.

10. An apparatus according to claim 7, wherein said selectively controlling means includes means for selectively by-passing prescribed clock signal counting operations of said clock signal counter unit and providing control of characteristics of output signals produced thereby in accordance with externally applied signals for those respective actuator drive current components that cause said shutter actuator to hold open said shutter, so that said control circuit controls the generation of the respective components of said actuator drive current that open and close said shutter in accordance with clock signal counting operations of said clock signal counter unit, and controls the generation of that components of said actuator drive current that holds said shutter open in dependence upon said externally applied signals.

11. An apparatus according to claim 7, wherein said selectively controlling means includes means for controlling the operational functionality of said clock signal counter unit in dependence upon prescribed values of said control codes.

12. For use with a shutter control mechanism, said shutter control mechanism having a shutter actuator control circuit for supplying actuator drive current to a shutter actuator for controlling the opening and closing of the shutter, said actuator drive current containing a plurality of successive components which cause said shutter actuator to bring said shutter to a predetermined open position, hold said shutter in its predetermined open position, and subsequently return said shutter to its closed position, an apparatus for controlling the respective durations of the plurality of successive components of said actuator drive current comprising:

a clock signal counter unit coupled to controllably count clock signals supplied thereto and producing output signals in accordance with prescribed relationships among numbers of clock signals counted thereby and control codes supplied thereto representative of shutter aperture size and shutter speed, said clock signal counter unit including a master counter which sequences through successive time intervals associated with the successive components of said drive current and controls the counting of clock signals by said clock signal counter unit; and a control circuit coupled to said clock signal counter unit, for controlling the generation of the respective components of said actuator drive current in accordance with output signals produced by said clock signal counter circuit, and wherein said actuator drive current contains a sequence of variable duty cycle pulses through which said shutter actuator is held in its open position.

13. An apparatus according to claim 12, wherein said clock signal counter unit comprises a plurality of counter circuits associated with the respective components of said actuator drive current, coupled in a feedback path with said master counter, so as to cause said master counter to successively enable the operation of said counters for realizing the successive components of said actuator drive current.

14. An apparatus according to claim 12, wherein that one of said successive components of said actuator drive current which causes said shutter actuator to bring said shutter to its open position comprises a pair of successive opposite polarity current pulses, which drive said shutter actuator to accelerate said shutter from its closed position toward a predetermined open position and then brake the opening of said shutter so that said shutter is brought to said predetermined open position.

15. An apparatus according to claim 12, wherein that one of said successive components of said actuator drive current which causes said shutter actuator to return said shutter from its open position to its closed position comprises a pair of successive opposite polarity current pulses, which drive said shutter actuator to accelerate said shutter from its open position toward its closed position and then brake the closing of said shutter so that said shutter is brought to its closed position.

16. An apparatus according to claim 12, further including means for selectively controlling the operational functionality of said clock signal counter unit in accordance with external control signals applied thereto.

17. An apparatus according to claim 16, wherein said selectively controlling means includes means for selectively by-passing prescribed clock signal counting operations of said clock signal counter unit and providing control of characteristics of output signals produced thereby in accordance with externally applied signals, whereby said control circuit controls the generation of the respective components of said actuator drive current in dependence upon said externally applied signals.

18. An apparatus according to claim 17, wherein said selectively controlling means includes means for selectively by-passing clock signal counting operations of said clock signal counter unit and providing control of characteristics of output signals produced thereby under the exclusive control of externally applied signals, whereby said control circuit controls the generation of the respective components of said actuator drive current in accordance with said externally applied signals and exclusive of counting of clock signals produced by said clock signal generator circuit.

19. An apparatus according to claim 16, wherein said selectively controlling means includes means for selectively by-passing prescribed clock signal counting operations of said clock signal counter unit and providing control of characteristics of output signals produced thereby in accordance with externally applied signals for those respective actuator drive current components that cause said shutter actuator to hold open said shutter, so that said control circuit controls the generation of the respective components of said actuator drive current that open and close said shutter in accordance with clock signal counting operations of said clock signal counter unit, and controls the generation of that components of said actuator drive current that holds said shutter open in dependence upon said externally applied signals.

20. An apparatus according to claim 16, wherein said selectively controlling means includes means for controlling the operational functionality of said clock signal counter unit in dependence upon prescribed values of said control codes.

21. An apparatus according to claim 12, wherein said clock signal counter unit comprises a first counter for counting clock signals in accordance with the control code representative of shutter aperture size and a second counter for counting clock signals in accordance with the control code representative of shutter speed, said first and second counters being coupled in a feedback path to said master counter for causing said master counter to sequence through said successive time intervals associated with the successive components of said drive current and control the counting of clock signals by said clock signal counter unit.

22. For use with a shutter control mechanism, said shutter control mechanism having a shutter actuator control circuit for supplying actuator drive current to a shutter actuator for controlling the opening and closing of the shutter, said actuator drive current containing a plurality of successive components which cause said shutter actuator to bring said shutter to a predetermined open position and subsequently return said shutter to its closed position, an apparatus for controlling the respective durations of the plurality of successive components of said actuator drive current comprising:
- a clock signal counter unit coupled to controllably count clock signals supplied thereto and producing output signals in accordance with prescribed relationships among numbers of clock signals counted thereby and control codes supplied thereto representative of shutter aperture size and shutter speed;
- a control circuit, coupled to said clock signal counter unit, for controlling the generation of the respective components of said actuator drive current in accordance with output signals produced by said clock signal counter circuit; and
- wherein that one of said successive components of said actuator drive current which causes said shutter actuator to bring said shutter to said predetermined open position comprises a sequence of current pulses, the duty cycle of successive ones of which changes with time.

23. An apparatus according to claim 22, wherein said clock signal counter unit comprises first and second counter circuits associated with that one of said successive components of said actuator drive current which causes said shutter actuator to bring said shutter to said predetermined open position, said first counter circuit counting clock signals generated by said clock signal generator and producing an output signal representative of the on-time of the pulses of said sequence of variable duty cycle current pulses, and said second counter circuit counting clock signals generated by said clock signal generator and producing an output signal representative of the off-time of the pulses of said sequence of variable duty cycle current pulses, the total of the on-times and off-times of said sequence of pulses being such that said shutter is brought to said predetermined open position at a desired aperture size.

24. An apparatus according to claim 23, wherein said clock signal counter unit includes means for controlling the operation of said first and second counters so as to change with time the count values for which output signals are produced therefrom and thereby the on-times and off-times of successive ones of said sequence of variable duty cycle current pulses.

25. An apparatus according to claim 23, wherein that one of said successive components of said actuator drive current which causes said shutter actuator to close said shutter from said predetermined open position comprises a third current pulse of said second polarity and a third duration which causes said shutter actuator to accelerate said shutter from said predetermined open position toward its closed position, and a fourth current pulse of said first polarity and a fourth duration which drives said actuator to brake the closing of said shutter, so that said shutter is brought to its closed position, and wherein said clock signal counter unit comprises a third counter circuit which generates an output signal representative of the duration of said third current pulse and said fourth counter circuit which generates an output signal representative of the duration of said fourth current pulse, the combination of said third and fourth current pulses corresponding to the actuator drive current necessary to return said shutter to its closed position.

26. An apparatus according to claim 25, further including an auxiliary device control circuit for controllably synchronizing the operation of an auxiliary device, said auxiliary device control circuit including means, coupled to said clock signal counter unit, for generating an auxiliary device control signal for operating said auxiliary device in synchronism with the generation of said third current pulse.

27. For use with a shutter control mechanism, said shutter control mechanism having a shutter actuator control circuit for supplying actuator drive current to a shutter actuator for controlling the opening and closing of the shutter, said actuator drive current containing a plurality of successive components which cause said shutter actuator to bring said shutter to a predetermined open position and subsequently return said shutter to its closed position, an apparatus for controlling the respective durations of the plurality of successive components of said actuator drive current comprising:
- a clock signal counter unit coupled to controllably count clock signals supplied thereto and producing output signals in accordance with prescribed relationships among numbers of clock signals counted thereby and control codes supplied thereto representative of shutter aperture size and shutter speed;
- a control circuit, coupled to said clock signal counter unit, for controlling the generation of the respective components of said actuator drive current in accordance with output signals produced by said clock signal counter circuit; and wherein said actuator drive current contains a first component that causes said shutter actuator to bring said shutter from a closed position to a preliminary open position, a plurality of second, varying duty cycle components that cause said shutter actuator to gradually further open said shutter from said preliminary open position to a prescribed aperture opening position, and a third component that causes said shutter actuator to close shutter.

28. An apparatus according to claim 27, wherein that one of said plurality of second, variable duty cycle components of said actuator drive current which causes said shutter actuator to gradually further open said shutter from said preliminary open position to said predetermined open position associated with a prescribed aperture comprises a sequence of first current pulses of a first polarity the on-times of successive ones of which change with time.

29. An apparatus according to claim 27, wherein said first component of said actuator drive current which causes said shutter actuator to bring said shutter to its preliminary open position comprises a second current pulse of said first polarity and a first duration, which drives said shutter actuator to accelerate said shutter from its closed position toward said preliminary open position, and a third current pulse of a second polarity and a second duration, which drives said actuator to brake the opening of said shutter so that said shutter is brought to said preliminary open position.

30. An apparatus according to claim 29, wherein said third component of said actuator drive current which causes said shutter actuator to close said shutter from said predetermined open position comprises a fourth current pulse of said second polarity and a third duration which causes said shutter actuator to accelerate said shutter from said predetermined open position toward its closed position, and a fifth current pulse of said first polarity and a fourth duration which drives said actuator to brake the closing of said shutter so that said shutter is brought to its closed position.

31. An apparatus according to claim 30, wherein said clock signal counter unit comprises a plurality of counter circuits, associated with the components of said actuator drive current, and being coupled to count respective pluralities of clock signals in accordance with said control codes and thereby define the durations of the first, second and third components of said actuator drive current.

32. An apparatus according to claim 31, wherein said clock signal counter comprises first and second counter circuits associated with said second variable duty cycle component of said actuator drive current which causes said shutter actuator to gradually open said shutter from said preliminary open position to said predetermined open position, said first counter circuit counting clock signals generated by said clock signal generator and producing an output signal representative of the on-time of a respective one of said sequence of first current pulses, and said second counter circuit counting clock signals generated by said clock signal generator and producing an output signal representative of the off-time of a respective one of said sequence of third current pulses, and means for controlling the operation of said first and second counters so as to change with time the count values for which output signals are produced therefrom and thereby the on-times and off-times of successive ones of said sequence of first current pulses.

33. For use with a shutter control mechanism, said shutter control mechanism having a shutter actuator control circuit for supplying actuator drive current to a shutter actuator for controlling the opening and closing of the shutter, said actuator drive current containing a plurality of successive components which cause said shutter actuator to bring said shutter to a predetermined open position and subsequently return said shutter to its closed position, an apparatus for controlling the respective durations of the plurality of successive components of said actuator drive current comprising:
 a clock signal counter unit coupled to controllably count clock signals supplied thereto and producing output signals in accordance with prescribed relationships among numbers of clock signals counted thereby and control codes supplied thereto representative of shutter aperture size and shutter speed, said clock signal counter unit including a master counter which sequences through successive time intervals associated with the successive components of said drive current and controls the counting of clock signals by said clock signal counter unit; and
 a control circuit coupled to said clock signal counter unit, for controlling the generation of the respective components of said actuator drive current in accordance with output signals produced by said clock signal counter circuit, and wherein said actuator drive current contains a first component that causes said shutter actuator to open said shutter to a first open position, second varying duty cycle components that further open said shutter to a second open position, and a third component that closes said shutter.

34. An apparatus according to claim 33, wherein said second, variable duty cycle components of said actuator drive current which causes said shutter actuator to further open said shutter to a second open position comprises means for generating a sequence of pulses at a first duty cycle thereby holding said shutter open at said first open position and thereafter increasing the duty cycle of said pulses so as to cause said shutter to be further opened to said second open position.

* * * * *